United States Patent [19]
Fukumori et al.

[11] Patent Number: 5,902,479
[45] Date of Patent: May 11, 1999

[54] OIL FILTER INCORPORATING A DRAIN VALVE

[75] Inventors: Sadahito Fukumori, Kariya; Masahiro Tomita, Obu; Kazuki Matsubara, Kariya, all of Japan

[73] Assignee: Denso Corporation, Kariya, Japan

[21] Appl. No.: 08/944,403

[22] Filed: Oct. 6, 1997

[30] Foreign Application Priority Data

Oct. 7, 1996 [JP] Japan .................................. 8-265757

[51] Int. Cl.$^6$ .................................................. B01D 35/16
[52] U.S. Cl. ...................... 210/248; 210/429; 210/433.1; 210/440; 210/DIG. 17
[58] Field of Search .................................. 210/130, 136, 210/248, 429, 430, 433.1, 440, 443, 444, DIG. 17; 123/196 A

[56] References Cited

U.S. PATENT DOCUMENTS 4,906,365  3/1990  Baumann et al. ...................... 210/238

FOREIGN PATENT DOCUMENTS 1544964  11/1968  France .................................. 210/444
4408888 A1  9/1994  Germany .
4428771 A1  2/1996  Germany .
8-57209  3/1996  Japan .
2287199  9/1995  United Kingdom .

Primary Examiner—Matthew O. Savage
Attorney, Agent, or Firm—Nixon & Vanderhye, P.C.

[57] ABSTRACT

An oil filter includes a housing having a case and a cap detachably engaged with each other and a filter element detachably contained in the housing. An oil-draining hole is provided at a bottom portion of the case. The oil filter further includes a plug member for opening and closing the draining oil hole and a spring member for operating the plug member according to an engagement state of the case and the cap. At an intermediate condition of the engagement state of the case and the cap, the plug member moves to the cap side to open the oil-draining hole. Therefore, before changing the filter element, oil staying in the oil filter can be readily securely discharged to the outside.

9 Claims, 5 Drawing Sheets

OIL FILTER INCORPORATING A DRAIN VALVE

CROSS-REFERENCE TO RELATED APPLICATION

This application is related to and claims priority from Japanese Patent Application No. Hei. 8-265757, filed on Oct. 7, 1996, the contents of which are hereby incorporated by reference.

BACKGROUND OF THE INVENTION

1. Field of the Invention

The present invention relates to a filter having a changeable filter element, which can be used, for example, for filtering a lubrication oil in an engine.

2. Description of Related Art

Conventionally, a method for changing a filter element disposed in a filter is described in JP-A-8-57209 and U.S. Pat. No. 4,906,365. In the conventional method, before changing the filter element, oil staying in the filter is discharged. However, the filter has a special oil passage for draining the oil into a crankcase of the engine. Therefore, it is difficult to change a filter element in a conventional filter where the special oil passage is not provided.

SUMMARY OF THE INVENTION

In view of the foregoing problems, it is an object of the present invention to provide a filter in which a special passage for draining fluid is not provided and a filter element thereof is readily changed.

It is an another object of the present invention to provide a filter which readily securely drains fluid staying in the filter to the outside.

According to the present invention, the above objects are achieved by providing a filter for filtering fluid which includes a case for receiving the fluid, and the case has first and second case portions detachably engaged with each other. A through hole for discharging the fluid is in the case. The filter further includes a filter element detachably provided in the case, for filtering the fluid introduced into the case, a valve for opening and closing the through hole, and an operation member for operating the valve according to an engagement state between the first and second case portions. Therefore, oil staying in the housing can be securely discharged to the outside.

Preferably, the valve opens the through hole when an engagement between the first and second case portions is relieved. Therefore, by only relieving the engagement between the first and the second case portions, oil staying in the oil filter can be automatically discharged to the outside.

More preferably, the filter further includes an engagement unit for engaging the first and second case portions in an engagement range, and the operation member operates the valve to open the through hole at an intermediate position of the engagement range. Therefore, at the intermediate position of the engagement range, oil staying in the housing can be readily securely discharged to the outside while maintaining a sealed state between the first and second case portions.

Still more preferably, the first and said second case portions each rotate in an opposite direction by the engagement unit, and the valve and the through hole are provided in an axial direction of one of the first and second case portions. Therefore, according to a relative moving distance of the first and second case portions, a connection state between the valve and the through hole can be readily changed.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PRESENTLY PREFERRED EMBODIMENTS

Preferred embodiments of the present invention are described hereinafter with reference to the accompanying drawings.

A first preferred embodiment of the present invention will be described with reference to FIGS. 1 through 4.

Figure 1:
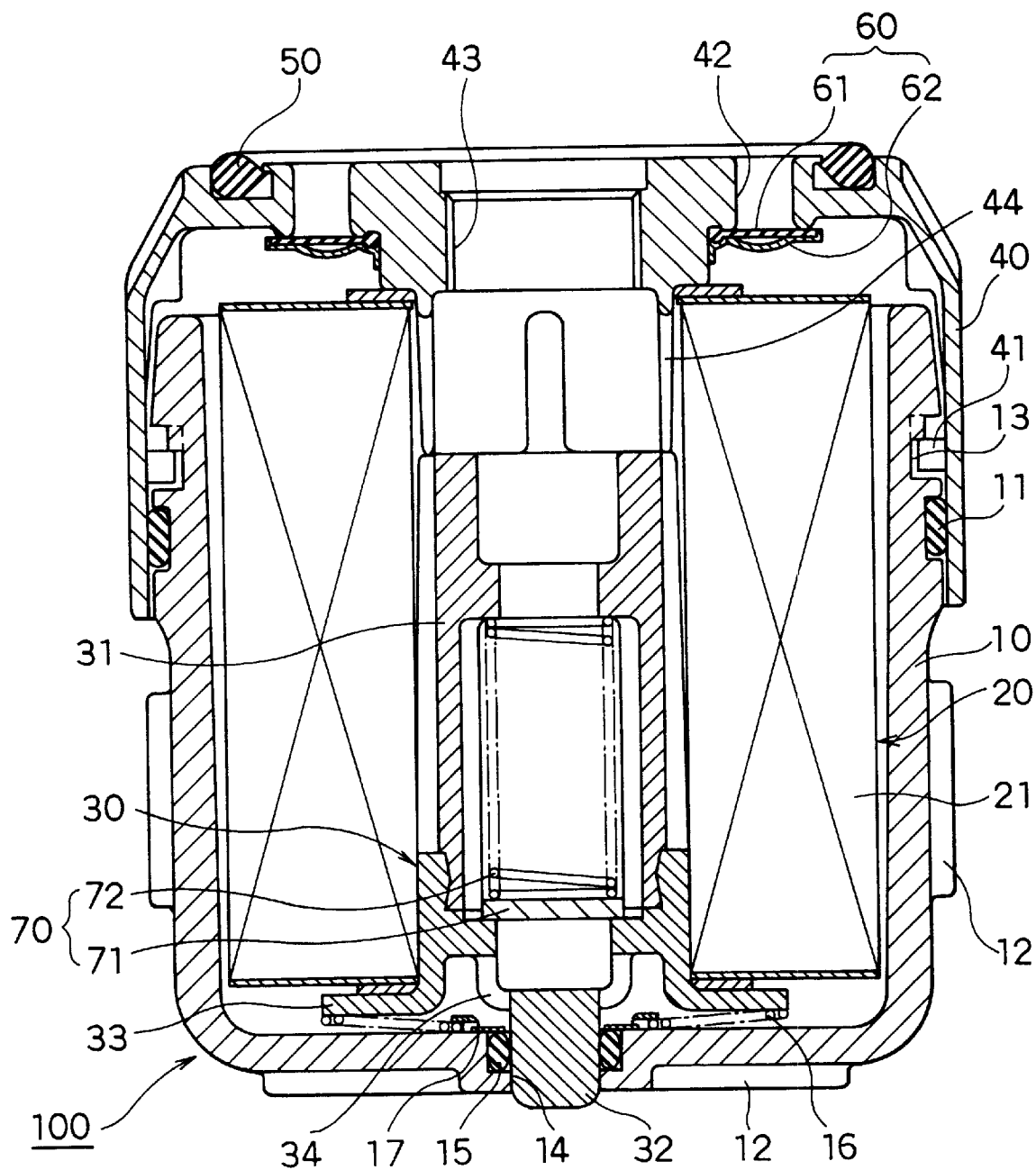
FIG. 1 is a cross-sectional view showing a filter in a usual state according to a first preferred embodiment of the present invention.

As shown in FIG. 1, a filter 100 (hereinafter referred to as "oil filter") having a changeable filter element includes a case 10 and a cap 40 which are each formed in a cylindrical shape having an opened end portion and a bottom end portion and are connected to each other to form a cylindrical housing. The case 10 and the cap 40 are made of metal such as aluminum, and are liquid-tightly connected to each other through an O-ring 11. A plurality of ribs 12 are provided on peripheral and bottom outer surfaces of the case 10, and a groove portion 13 having a plurality of grooves is provided on an outer peripheral surface of the case 10 proximate to the opened end portion of the cylindrical case 10. A protrusion portion 41 engaging the groove portion 13 of the case 10 is provided on an inner peripheral surface of the cap 40 proximately to the opened end portion of the cylindrical cap 40. Further, an oil inlet 42 is provided on the top surface of the cap 40, and an oil outlet 43 is provided at a center portion of the top surface thereof. A male screw portion is provided on inner peripheral surface of the oil outlet 43 of the cap 40. In the first embodiment, the groove portion 13 and the protrusion portion 41 are engaged so that the case 10 and the cap 40 are connected to each other.

A filter element assembly 20 has a cylindrical filter element 21 which is formed by folding a filter paper. The filter element assembly 20 is detachably inserted into and contained in an insertion space formed by a projection member 31 having a flat gear-shaped outer peripheral section, a flange portion 33 of a plug member 32 and a projection member 44 having an enlarged groove portion. The projection member 44 is connected to the cap 40. The projection member 31 is integrated with the plug member 32 to form a plug assembly 30. Hereinafter, the filter element assembly 20 is referred to as "element S/A (Sub-Assembly) 20", and the plug assembly 30 is referred to as "plug S/A 30".

An oil-draining hole 14 for draining oil to the outside is formed in a bottom center portion of the cap 10, and an O-ring 15 is inserted into the oil-draining hole 14 of the case 10. A conical-shaped spring member 16 as an operation member is disposed between the flange portion 33 of the plug member 32 and an inner bottom portion of the case 10. That is, one end of the spring member 16 is fixed to the inner bottom portion of the case 10 by a fixing plate 17, and another end thereof is fixed to the flange portion 33 of the plug member 32. A check valve 60 includes a valve member 61 made of rubber and a spring member 62 made of metal for supporting an opening-closing operation of the valve member 61. The check valve 60 is disposed at an inner end side of the oil inlet 42 of the cap 40. When the engine is operated and the filtering capacity of the filter element 21 of the element S/A 20 detachably provided in the oil filter 100 is sufficient, dirty oil flows from the engine to the oil filter 100 through the oil inlet 42 and the check valve 60. When the engine is stopped, the check valve 60 closes the oil inlet 42.

A bottom end portion of the plug member 32 of the plug S/A 30 can be air-tightly inserted into the oil-draining hole 14 through the O-ring 15. The projection member 31 of the plug S/A 30 also has a gear-shaped inner peripheral section, and a plate 71 is slidably disposed at an inner peripheral end of the projection member 31. By the spring force of the spring 72, the plate 71 contacts a base seat of the plug member 32 to form a seal therebetween. A relief valve 70 is constituted by the plate 71 and the spring 72.

An oil passage 34 is formed in the plug member 32. When the filter element 21 of element S/A 20 contained in the oil filter 100 is clogged so that the filtering capacity of the filter element 21 greatly and oil pressure in the oil filter 100 is increased to a predetermined value larger than the spring force of the spring 72, the plate 71 of the relief valve 70 moves to the upper side in FIG. 1. Therefore, dirty oil returns to the engine side through the oil passage 34 of the plug member 32, the relief valve 70, the inner portion of the projection member 31 of the plug S/A 30, the projection portion 44 of the cap 40 and the oil outlet 43.

The spring member 16 is held and contained between the flange 33 of the plug member 32 of the plug S/A 30 and the inner bottom surface of the case 10. The screw portion of the oil outlet 43 of the case 40 is screwed into a screw portion of a cylinder block (not shown) of the engine so that the case 40 is fixed to an insertion seat (not shown) of the cylinder block. A gasket 50 is provided on an outer peripheral end of the case 40 so that the case 40 is liquid-tightly connected to the insertion seat of the cylinder block of the engine.

Next, an operation for discharging oil staying within the oil filter 100 before changing the element S/A 20 will be described with reference to FIGS. 1 and 2.

First, the groove portion 13 of the case 10 engaged with the protrusion portion 41 of the cap 40 is rotated by a tool (not shown) or a hand using the ribs 12. With the rotation, the connection between the case 10 and the cap 40 is gradually relieved, and the case 10 is separated from the cap 40. At this time, the plug S/A 30 is biased toward the projection portion 44 at the cap side by the spring member 16. Therefore, when the case 10 is separated from the cap 40, the end portion of the plug member 32 inserted into the oil-draining hole 14 of the case 10 moves relative to the case 10.

Figure 2:
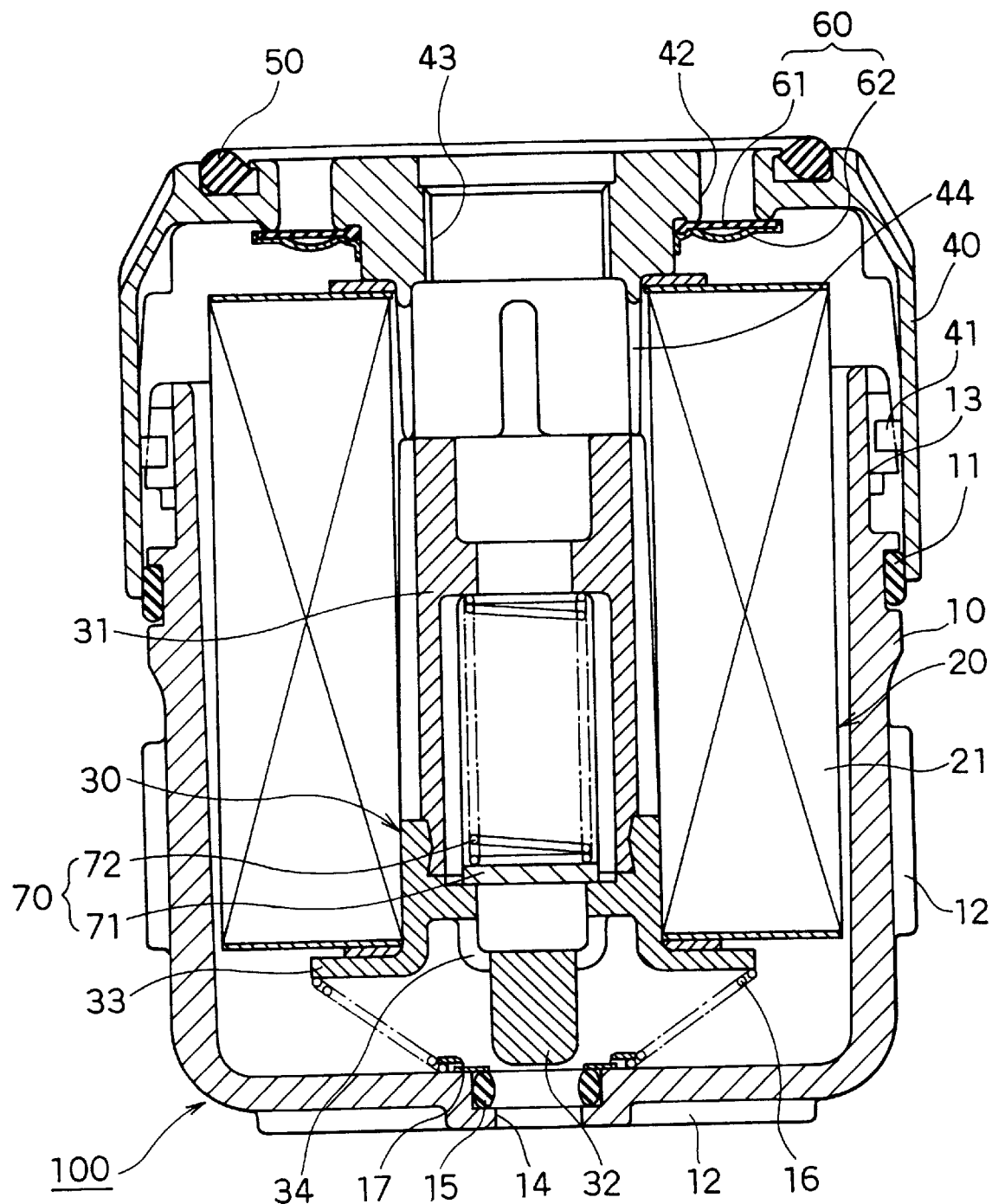
FIG. 2 is a cross-sectional view showing the filter in an oil-draining state before changing a filter element according to the first embodiment.

As shown in FIG. 2, when the case 10 is rotated to a predetermined position, oil staying in the oil filter 100 flows to the outside through the oil-draining hole 14. At an intermediate portion of the engagement between the case 10 and the cap 40, although oil is discharged from the oil-draining hole 14, the groove portion 13 of the case 10 is liquid-tightly engaged with the protrusion portion 41 of the cap 40 through the O-ring 11. At this time, since the check valve 60 closes the oil inlet 42, only the oil staying within the oil filter 100 discharges from the oil-draining hole 14. After draining oil staying within the oil filter 100, the element S/A 20 is changed.

That is, when the case 10 rotates relative to the cap 40 so that the case 10 is entirely separated from the cap 40, the projection portion 44 of the cap side, the element S/A 20 and the plug S/A 30 are at the case side. Next, the element S/A 20 is replaced with a new one. At this time, if it is necessary to change the O-rings 11 and 15, the O-rings 11 and are also changed before assembling the case 10 and the cap 40.

New element S/A 20 is inserted into the insertion portion of the case 10, and the case 10 is rotated to be engaged with the cap 40. By the above-described process, work for changing the element S/A 20 is finished.

Figure 3:
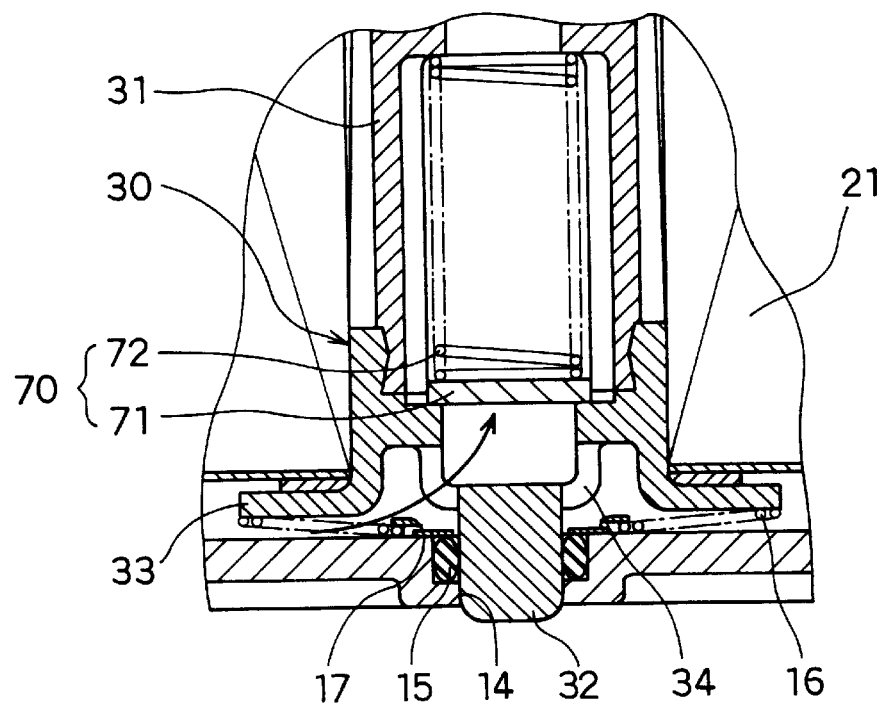
FIG. 3 is a partial cross-sectional view of the filter in FIG. 1, showing oil flow when the filter element has sufficient filtering capacity and a relief valve is not operated.
Figure 4:
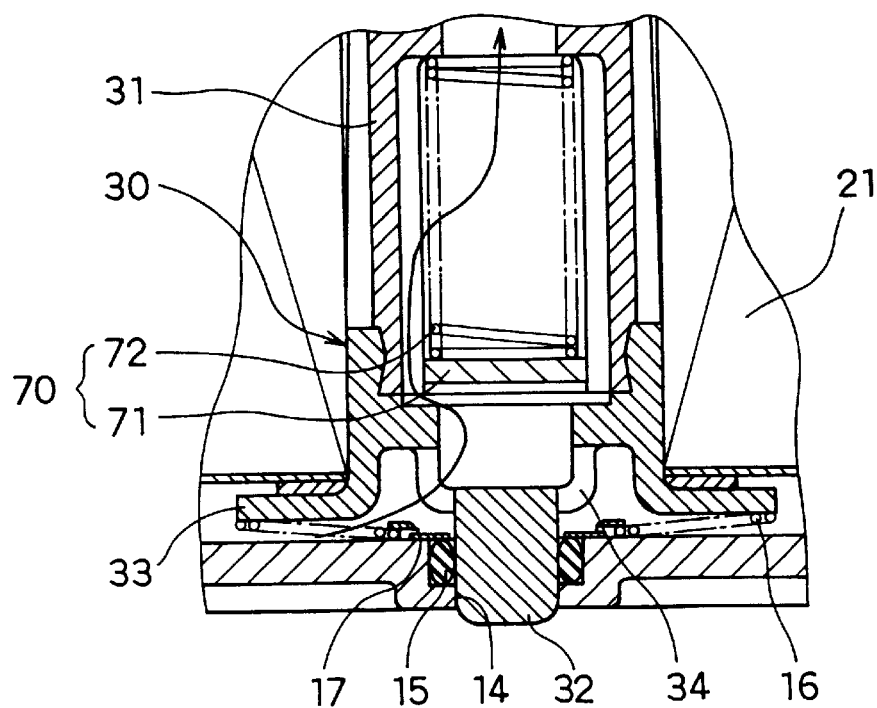
FIG. 4 is a partial cross-sectional view of the filter in FIG. 1, showing oil flow when the filter element has insufficient filtering capacity and the relief valve is operated.

Next, an operation of the relief valve 70 in an operation state of the oil filter 100 attached on the cylinder block of the engine will be described with reference to FIGS. 1, 3 and 4.

As shown in FIG. 1, when the filtering capacity of the filter element 21 of the element S/A 20 contained in the oil filter 100 is sufficient when the engine is operated, dirty oil sent from the engine flows into the oil filter 100 through the oil inlet 43 of the cap 40 and the check valve 60. That is, when a pressure difference between a front side (i.e., the engine side) and a rear side (i.e., the oil filter side) of the valve member 61 of the check valve 60 is larger than the spring force of the spring member 62, the check valve 62 opens the oil inlet 42 so that dirty oil from the engine flows into the oil filter 100. The dirty oil is filtered by the filter element 21 of the element S/A 20, and the filtered oil returns to the engine through the outer peripheral groove portion of the projection member 31 of the plug S/A 30, the enlarged groove portion of the projection portion 44 of the case 40 and the oil outlet 43. At this time, as shown in FIG. 3, the spring force of the spring 72 of the relief valve 70 is larger than the pressure of oil in the oil filter 100, and the plate 71 of the relief valve 70 contacts the base seat of the plug S/A 30. When the operation of the engine is stopped, the oil inlet 42 of the cap 40 is closed by the check valve 60.

When the filter element 21 of the element S/A 20 contained in the oil filter 100 is clogged so that the pressure in the oil filter 100 increases to a predetermined value larger than the spring force of the spring 72 of the relief valve 70, the plate 71 of the relief valve 70 moves to the cap side (i.e., the upper side in FIG. 1). Therefore, dirty oil returns to the engine through the oil passage 34 provided in the plug member 32 of the plug S/A 30, the inner passage of the protection member 31 and the oil outlet 43. That is, the plate 71 of the relief valve 70 is separated from the base seat of the plug S/A 30 so that the relief valve 70 opens the inner passage of the projection member 31. Because dirty oil from the engine does not pass through the filter element 21 of the element S/A 20, the dirty oil returns to the engine without being filtered.

As described above, the oil filter 100 includes a housing having the case 10 and the cap 40 which are detachably connected to each other, the element S/A 20 detachably contained in the housing, the oil-draining hole 14 penetrating through the case 10, the plug member 32 for opening or closing the oil-draining hole 14, and the spring member 16 which operates the plug member 32 according to an engagement state between the case 10 and the cap 40. In the first embodiment, according to the engagement state between the case 10 and the cap 40, the spring member 16 operates the plug member 32 to open or close the oil-draining hole 14 formed in the case 10. Therefore, oil staying in the oil filter 100 is readily securely discharged to the outside.

When the case 10 and the cap 40 are separated from each other, the spring member 16 operates the plug member 32 to open the oil-draining hole 14. Therefore, by only releasing the connection between the case 10 and the cap 40, oil staying in the oil filter 100 can be automatically readily discharged to the outside from the oil-draining hole 14.

According to the first embodiment, the plug S/A 30 is integrally connected to the projection member 44 of the cap side, and the spring member 16 is disposed between the bottom inner surface of the case 10 and the flange portion 33 of the plug S/A 30. Therefore, when the connection between the case 10 and the cap 40 is released, the plug member 32 moves to the cap side by the spring force of the spring member 16, and thereby the oil-draining hole 14 is opened.

Further, the case 10 has the groove portion 13 and the cap 40 has the protrusion portion 41. Due to the action of the groove portion 13 and the protrusion portion 41, the case 10 and the cap 40 are engaged with each other in an engagement range. At an intermediate position of the engagement range of the case 10 and the cap 40, the spring member 16 operates the plug member 32 to open the through hole. Therefore, at the intermediate position of the engagement range, the plug member 32 opens the through hole while maintaining the engagement between the case 10 and the cap 40, so that oil staying in the oil filter 100 can be readily securely discharged to the outside.

Further, in the oil filter 100, the groove portion 13 of the case 10 and the protrusion portion 41 of the cap 40 are engaged with or separated from each other by rotating the case 10 and the cap 40 in opposite relative directions, and the plug member 32 and the oil-draining hole 14 are provided in the same axial direction. Therefore, when the case 10 and the cap 40 are rotated in opposite directions, the groove portion 13 of the case 10 and the protrusion portion 41 of the cap 40 engage with or separate from each other. In this case, since the plug member 32 and the oil-draining hole 14 are provided in the same axial direction, the plug member 32 and the oil-draining hole 14 are connected to or separated from each other according to a moving distance of the engagement position between the groove portion 13 and the protrusion portion 41. That is, by changing the engagement position between the case 10 and the cap 40, the connection state between the oil-draining hole 14 and the plug member 32 can be changed.

Figure 5:
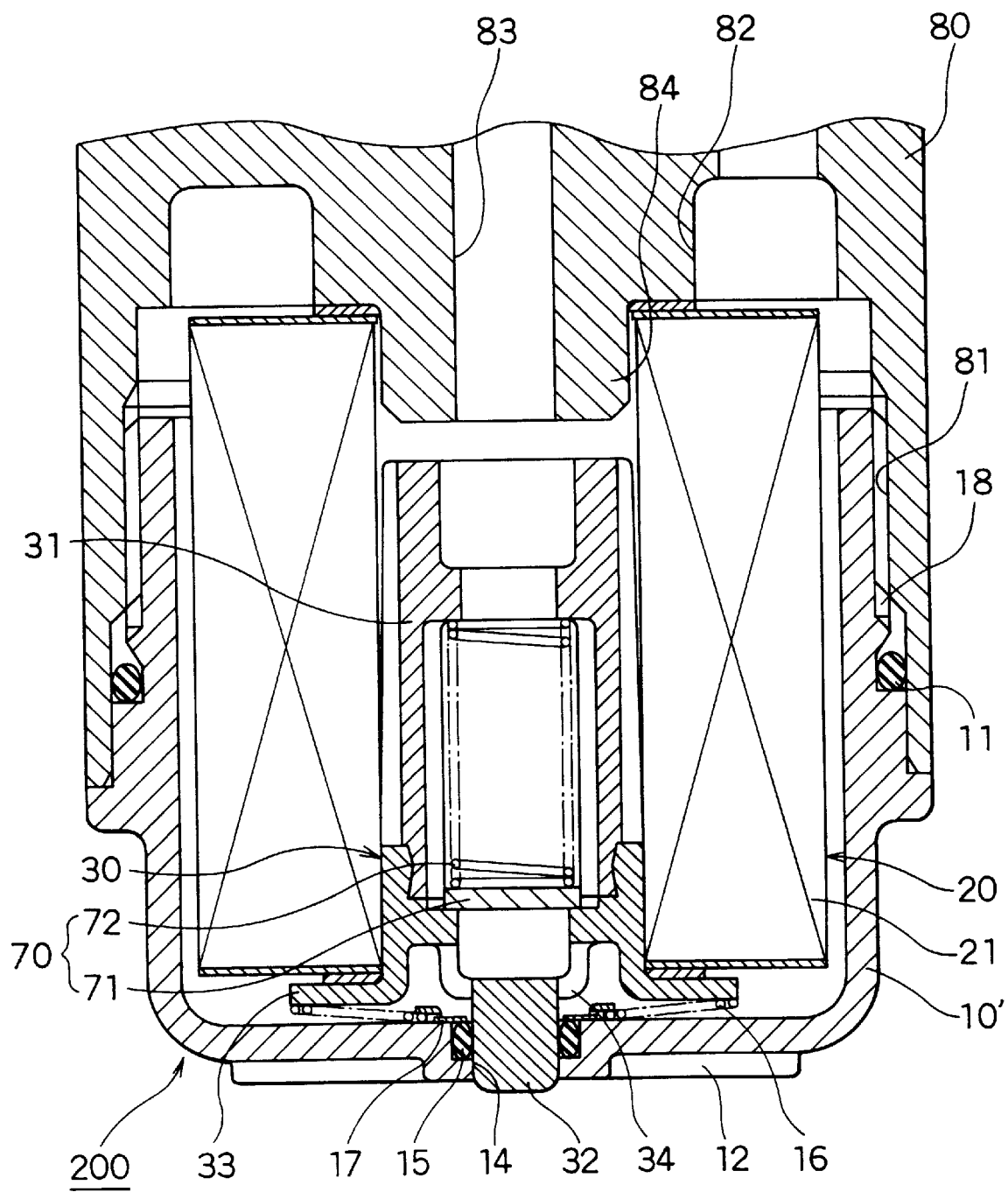
FIG. 5 is a cross-sectional view showing a filter in a usual state according to a second preferred embodiment of the present invention.
Figure 6:
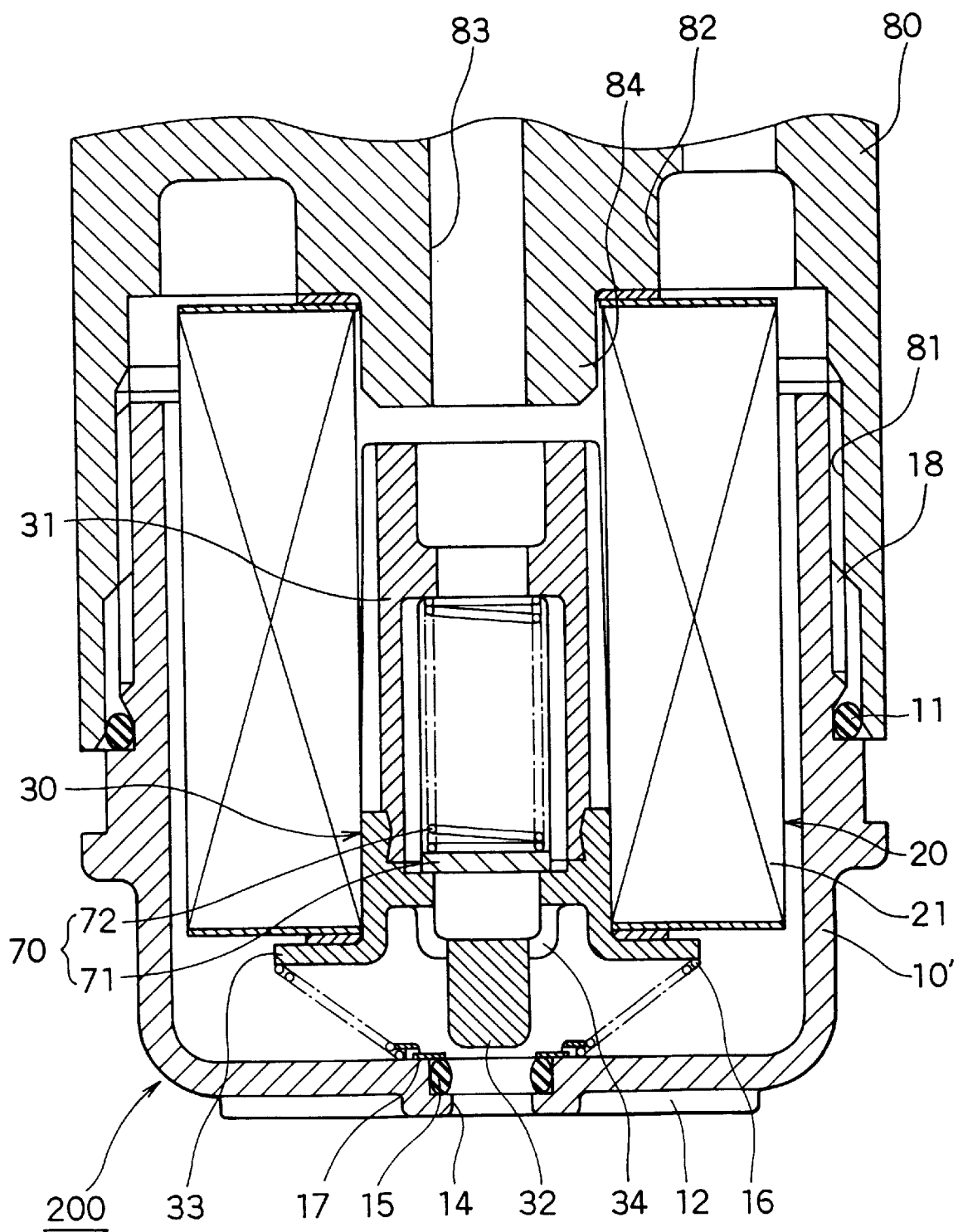
FIG. 6 is a cross-sectional view showing the filter in an oil-draining state before changing a filter element according to the second embodiment.

A second preferred embodiment of the present invention will be described with reference to FIGS. 5 and 6. FIG. 5 is a cross-sectional view showing a filter in a usual state according to the second embodiment of the present invention, and FIG. 6 is a cross-sectional view showing the filter in an oil-draining state before changing a filter element. In the second embodiment, the same portions as the first embodiment use the same reference numbers and explanation thereof is omitted.

As shown in FIG. 5, an oil filter 200 includes a case 10' made of aluminum. The case 10' is formed in a cylindrical shape having a bottom end portion and an opened end portion. An engine block 80 is used as a cap of the oil filter 200, and is liquid-tightly connected to the case 10' through O-ring 11. A screw portion 18 is provided on an inner peripheral surface proximate to the opened end portion of the case 10', and a screw portion 81 is provided on the engine block 80 to be engaged with the screw portion 18 of the case 10'. An oil inlet 82 through which oil in the engine flows into the oil filter 200 is formed at an inner peripheral side of the screw portion 81 of the engine block 80, and an oil outlet 83 through which oil in the oil filter 200 returns to the engine is formed at a center portion of the engine block 80. A projection portion 84 for receiving the element S/A 20 is formed in the engine block 80.

Next, an operation for draining oil staying in the oil filter 200 before changing the element S/A 20 will be described with reference to FIGS. 5 and 6.

First, the screw portion 18 of the case 10' screwed with the screw portion 81 of the engine block 80 is rotated by a tool or a hand using the ribs 12 provided on the outer surface of the case 10'. With the rotation of the case 10', the connection between the case 10' and the engine block 80 is gradually released so that the case 10' is separated from the engine block 80. At this time, the plug member 32 of the plug S/A 30 inserted into the oil-draining hole 14 of the case 10' moves relative to the oil-draining hole 14 to open the oil-draining hole 14.

As shown in FIG. 6, when the case 10' is rotated to a predetermined position, oil in the oil filter 200 flows out from the oil-draining hole 14 to the outside. At an intermediate position of the engagement between the screw portion 18 of the case 10' and the screw portion 81 of the engine block 80, the spring member 16 operates the plug member 30 to open the oil-draining hole 14 while maintaining a sealing state between the case 10' and the engine block 80. After draining oil in the oil filter 200, the element S/A 20 is changed.

That is, when the case 10' is further rotated relative to the engine block 80 so that the case 10' is separated from the engine block 80, the element S/A 20 and the plug S/A 30 are at the case side. Next, the element S/A 20 is replaced with a new one. At this time, if it is necessary to change the O-rings 11 and 15, the O-rings 11 and 15 are also changed before assembling the case 10' and the engine block 80.

After changing the element S/A 20, the case 10' is rotated to be engaged with the engine block 80. According to the above-described process, the work for changing the element S/A 20 is finished.

The operation of the relief valve 70 in the operation state of the oil filter 200 is similar to that in the first embodiment, and the explanation of the relief valve 70 is omitted.

In the second embodiment, the oil filter 200 includes a housing having the case 10' and the engine block 80 detachably engaged with each other, the element S/A 20 detachably contained in the housing, the oil-draining hole 14 penetrating through the case 10', the plug member 32 opening and closing the oil-draining hole 14, and the spring member 16 which operates the plug member 32 to open and close the oil-draining hole 14 according to the engagement state between the case 10' and the engine block 80. In the oil filter 200, the spring member 16 operates the plug member 32 to open or close the oil-draining hole 14 according to the engagement state between the case 10' and the engine block 80. Therefore, oil staying in the oil filter 200 can be readily securely discharged to the outside through the oil-draining hole 14.

Further, when the engagement between the case 10' and the engine block 80 is released, the plug member 32 opens the oil-draining hole 14. Therefore, by only releasing the engagement between the case 10' and the engine block 80, oil staying in the oil filter 200 can be automatically discharged to the outside through the oil-draining hole 14.

Further, the spring member 16 is disposed between the flange portion 33 of the plug member 32 and the bottom inner surface of the case 10'. Therefore, when the connection between the case 10' and the engine block 80 is released, the plug member 32 is moved to the engine block side due to the spring force of the spring member 16 to open the oil-draining hole 14.

In the second embodiment, the screw portion 18 is provided in the case 10' and the screw portion 81 is provided in the engine block 80, and the screw portion 18 and the screw portion 81 are engaged in an engagement range. At an intermediate position of the engagement range, the plug member 32 opens the oil-draining hole 14 while keeping the seal state between the case 10' and the engine block 80.

The case 10' and the engine block 80 are rotated in opposite relative directions so that the case 10' and the engine block 80 are engaged with or separated from each other. Further, the plug member 32 and the oil-draining hole 14 are provided in the same axial direction. Therefore, according to the moving distance of the engagement between the screw portions 18 and 81, the plug member 32 moves relative to the oil-draining hole 14.

Although the present invention has been fully described in connection with preferred embodiments thereof with reference to the accompanying drawings, it is to be noted that various changes and modifications will become apparent to those skilled in the art.

For example, in each of the embodiments, the spring member 16 is formed in a conical shape having a circular cross-section. However, the shape of the spring member 16 may be changed. Further, in each of the embodiments, the spring member 16 for biasing the plug member 32 is used as the operation member. However, the operation member may be implemented by a connection member connecting the plug member 32 and the cap 40 or a connection member connecting the plug member 32 and the engine block 80. Further, the case 10 may made of resin.

Such changes and modifications are to be understood as being within the scope of the present invention as defined by the appended claims.

What is claimed is:

1. A filter for filtering fluid in an engine, said filter comprising:

a case for receiving the fluid, said case having first and second case portions detachably engaged with each other, said first case portion having an inlet through which the fluid from said engine flows therein and an outlet through which the fluid in said case flows into said engine, said second case portion having a through hole for discharging the fluid therefrom;

a filter element in said case, for filtering the fluid;

a valve for opening and closing said through hole; and an operation member for operating said valve, said operation member including a biasing member having first and second ends, said first end of said biasing member being connected to said valve and said second end of said biasing member being connected to said second case portion, wherein said biasing member operates said valve according to an engagement state of said first and second case portions.

2. A filter according to claim 1, wherein said first case portion is connectable to said engine.

3. A filter according to claim 1, wherein said operation member operates said valve to open said through hole when an engagement between said first and second case portions is relieved.

4. A filter according to claim 1, further comprising:

an engagement unit for engaging said first and said second case portions in an engagement range, wherein said operation member operates said valve to open said through hole at an intermediate position of said engagement range.

5. A filter according to claim 1, wherein said engagement unit includes a groove portion on an outer surface of said first case portion and a protrusion portion on an inner surface of said second case portion to be engaged with said groove portion.

6. A filter according to claim 1, wherein said engagement unit includes a female screw portion on an outer surface of said first case portion and a male screw portion on an inner surface of said second case portion to be engaged with said female screw portion.

7. A filter according to claim 1, wherein:

said first and second case portions are relatively ratable in opposite directions in accordance with said engagement unit; and said valve and said through hole are provided in an axial direction of one of said first and second case portions.

8. A filter according to claim 1, wherein:

said valve is an insertion member inserted into said through hole; and said operation member operates said insertion member to separate it from said through hole to open said through hole at an intermediate position of said engagement range.

9. A filter for filtering fluid in an engine, said filter comprising:

a case for receiving the fluid, said case having first and second case portions detachably engaged with each other, said first case portion having an inlet through which the fluid from said engine flows therein and an outlet through which the fluid in said case flows into said engine, said second case portion having a through hole for discharging the fluid therefrom;

a filter element in said case, for filtering the fluid;

a valve movable along an axis of said through hole; and an operation member engaged with said valve, said operation member being movable along the axis of said through hole according to a relative position between said first and second case portions, said operation member including a biasing member having first and second ends, said first end of said biasing member being connected to said valve and said second end of said biasing member being connected to said second case portion, wherein said biasing member operates said valve according to an engagement state of said first and second cases portions.

* * * * *